(12) United States Patent
Nachtrab et al.

(10) Patent No.: US 9,544,430 B2
(45) Date of Patent: Jan. 10, 2017

(54) METHOD AND SYSTEM FOR TRANSCRIPTION OF SPOKEN LANGUAGE

(75) Inventors: Michaela Nachtrab, München (DE); Robin Ribback, München (DE)

(73) Assignee: Verbavoice GMBH, Munich (DE)

( * ) Notice: Subject to any disclaimer, the term of this patent is extended or adjusted under 35 U.S.C. 154(b) by 564 days.

(21) Appl. No.: 13/504,550

(22) PCT Filed: Oct. 27, 2010

(86) PCT No.: PCT/EP2010/066239
§ 371 (c)(1),
(2), (4) Date: Jul. 6, 2012

(87) PCT Pub. No.: WO2011/051325
PCT Pub. Date: May 5, 2011

(65) Prior Publication Data
US 2012/0265529 A1    Oct. 18, 2012

(30) Foreign Application Priority Data

Oct. 27, 2009 (DE) .................................... 09174254

(51) Int. Cl.
*G10L 15/00* (2013.01)
*G10L 15/26* (2006.01)
(Continued)

(52) U.S. Cl.
CPC ........ *H04M 3/42391* (2013.01); *G06F 17/289* (2013.01); *G10L 15/22* (2013.01);
(Continued)

(58) Field of Classification Search
CPC ........ G10L 15/26; G10L 15/183; G10L 25/48; G10L 15/005; G10L 15/18; G10L 13/00; G06F 17/21; G06F 17/28; G06F 17/30976; G06F 1/163; G06F 2221/2111; G06F 17/2827; G06F 3/167; H04L 41/22; H04L 61/2007; H04L 61/6004; H04L 61/6059; H04L 63/107
(Continued)

(56) References Cited

U.S. PATENT DOCUMENTS 6,230,138 B1 * 5/2001 Everhart ................. G10L 15/26
454/74
6,385,586 B1 * 5/2002 Dietz ............................ 704/277
(Continued)

FOREIGN PATENT DOCUMENTS

EP          2106121 A1    9/2009
WO     2008141539 A    11/2008

OTHER PUBLICATIONS

Jie Yang et al: Smart Sight: A Tourist Assistant System, Wearable Computers, 1999. Digest of Papers, The Third International Symposium on San Francisco, CA, USA Oct. 18-19, 1999, Los Alamitos, CA, IEEE Comput. Soc, US, Oct. 18, 1999, pp. 73-78.
(Continued)

*Primary Examiner* — Michael Ortiz Sanchez
(74) *Attorney, Agent, or Firm* — Kenneth E. Horton; Kirton McConkie

(57) ABSTRACT

A method and system for transcription of spoken language into continuous text for a user comprising the steps of inputting spoken language of at least one user or of a communication partner of the at least one user into a mobile device of the respective user, wherein the input spoken language of the user is transported within a corresponding stream of voice over IP data packets to a transcription server; transforming the spoken language transported within the respective stream of voice over IP data packets into continuous text by means of a speech recognition algorithm run by said transcription server, wherein said speech recognition algorithm is selected depending on a natural language or dialect spoken in the area of the current position of said
(Continued)

mobile device; and outputting said transformed continuous text forwarded by said transcription server to said mobile device of the respective user or to a user terminal of the respective user in real time.

11 Claims, 14 Drawing Sheets

(51) Int. Cl.
- *G06F 17/28* (2006.01)
- *H04M 3/42* (2006.01)
- *G10L 15/30* (2013.01)
- *G10L 15/22* (2006.01)
- *H04N 21/2343* (2011.01)
- *H04N 21/81* (2011.01)

(52) U.S. Cl.
CPC ............ *G10L 15/26* (2013.01); *G10L 15/30* (2013.01); *H04M 2201/40* (2013.01); *H04M 2201/42* (2013.01); *H04M 2201/60* (2013.01); *H04M 2203/2061* (2013.01); *H04N 21/234336* (2013.01); *H04N 21/8106* (2013.01)

(58) Field of Classification Search
USPC ........................................ 704/1–10
See application file for complete search history.

(56) References Cited

U.S. PATENT DOCUMENTS

| | | | |
|---|---|---|---|
| 8,027,438 B2* | 9/2011 | Daigle et al. .............. 379/88.06 | |
| 8,041,555 B2* | 10/2011 | Buccella ......................... 704/2 | |
| 8,041,568 B2* | 10/2011 | Strope ................. G06Q 10/103 | |
| | | | 704/257 |
| 8,290,779 B2* | 10/2012 | Hoefelmeyer et al. .... 704/270.1 | |
| 8,386,231 B2* | 2/2013 | LeBeau et al. .................. 704/2 | |
| 8,447,285 B1* | 5/2013 | Bladon .................. G10L 15/26 | |
| | | | 370/300 |
| 8,538,742 B2* | 9/2013 | Wren et al. ...................... 704/2 | |
| 8,645,121 B2* | 2/2014 | Boyd et al. ...................... 704/2 | |
| 8,949,124 B1* | 2/2015 | Wooters ................. G10L 15/26 | |
| | | | 704/235 |
| 2002/0080926 A1 | 6/2002 | Engelke | |
| 2002/0161579 A1 | 10/2002 | Saindon | |
| 2003/0216922 A1* | 11/2003 | Gonzales et al. ............. 704/260 | |
| 2005/0080632 A1* | 4/2005 | Endo ...................... G10L 15/08 | |
| | | | 704/277 |
| 2006/0074660 A1* | 4/2006 | Waters ................... G10L 15/26 | |
| | | | 704/251 |
| 2008/0187108 A1 | 8/2008 | Engelke | |
| 2008/0221862 A1* | 9/2008 | Guo et al. ......................... 704/2 | |
| 2009/0030698 A1 | 1/2009 | Cerra et al. | |
| 2009/0048820 A1* | 2/2009 | Buccella ........................... 704/2 | |
| 2009/0076793 A1* | 3/2009 | Hoefelmeyer et al. ........... 704/3 | |
| 2009/0222257 A1* | 9/2009 | Sumita .................... G10L 15/26 | |
| | | | 704/3 |
| 2011/0134910 A1* | 6/2011 | Chao-Suren et al. ........ 370/352 | |
| 2011/0270609 A1* | 11/2011 | Jones ...................... H04M 3/56 | |
| | | | 704/235 |
| 2012/0035907 A1* | 2/2012 | Lebeau et al. .................... 704/2 | |
| 2015/0011251 A1* | 1/2015 | Parker .................... H04W 4/14 | |
| | | | 455/466 |
| 2015/0081288 A1* | 3/2015 | Kim ........................ G10L 15/30 | |
| | | | 704/231 |
| 2015/0106092 A1* | 4/2015 | Nolte ...................... G10L 15/26 | |
| | | | 704/235 |

OTHER PUBLICATIONS

European Patent Office, European Search Report for EP13199441, dated Apr. 2, 2014.

Bauman N.: "Web CapTel-Using Your Computer and ANY Phone to Make Captioned Calls", Mar. 18, 2008, XP002612588, http://www.hearinglosshelp.com/weblog/web-captel%E2%80%94using-your-computer-and-any-phone-to-make-captioned-calls.php (last accessed, Mar. 22, 2013).

International Search Report for PCT/EP2010/066239.

European Patent Office, European Search Report for Application No. EP 09 17 4254, dated Mar. 12, 2010.

* cited by examiner

Fig. 1 (state of the art)

METHOD AND SYSTEM FOR TRANSCRIPTION OF SPOKEN LANGUAGE

A method and system for transcription of spoken language

The invention relates to a method and a system for transcription of spoken language into a continuous text for a user, in particular for a hearing impaired person or a traveller.

A user such as a hearing impaired person or a travelling person in a foreign country often faces the problem that he is not able to understand what a communication partner is saying. In the case of a hearing impaired person or deaf person the user simply does not understand what a communication partner is saying because he can not understand acoustically what the communication partner is replying in a conversation. A travelling person such as a businessman in a foreign country often does not understand his communication partner because he does not understand the spoken language or dialect spoken in the country where he is travelling.

For persons with hearing disabilities Telecommunication Relay Services (TRS) are known to place and receive telephone calls. In these conventional Telecommunications Relay Services a communications assistance (CA) relays a call back and forth between a user and his communication partner. With such a Telecommunications Relay Service a person with a hearing disability can for example communicate in text with the communication assistant CA and the communication assistant CA communicates by voice with the other party to the call. In this Telecommunications Relay Service the communication assistant CA repeats in voice what the hearing impaired user has typed and types to the hearing impaired user what the communication partner has said.

A more recent Telecommunications Relay Service TRS is a so-called IP Captioned Telephone Service. A Captioned Telephone Service uses a special telephone that has a text screen to display captions of what the other party to the conversation is saying to the hearing impaired person. When using an IP Captioned Telephone Service the telephone of the user displays in real time captions of a current telephone conversation to the hearing impaired or deaf person. This IP telephone service allows a person with a hearing loss but who wants to use his or her own voice to speak directly to the called party and then to listen, to the extend possible, to the other party by simultaneously reading captions of what the other party is saying. Unlike a conventional Telecommunications Relay Service TRS which uses typed text the communications assistant CA repeats or revoices what is said and by using speech recognition technology, wherein the voice of the communication assistant CA is automatically transcribed into text and transmitted directly to the terminal of the hearing impaired user who can reads the captioned text on his display. FIG. 1 shows a block diagram for illustrating a conventional IP Captioned Telephone Service. The hearing impaired user U having a hearing loss speaks into a microphone of its terminal and his speech is transported via a network to the terminal of a communication partner CP of the telephone conversation. The speech of the communication partner CP is forwarded to a Speech Recognition Unit SRU which transcribes the revoiced speech of the communication partner CP provided by the communication assistant CA into text data which is forwarded to the terminal of the hearing impaired user U which can read the text on his display.

As can be seen from FIG. 1 the conventional IP Captioned Telephone Service is provided for a conversation between a user U and a remote communication partner CP allowing a user U such as a hearing impaired user to use his own voice for a telephone call with the other party. Terminals used by the IP Captioned Telephone Service as shown in FIG. 1 are special IP telephones connected to the network. The conventional IP Captioned Telephone Service system as shown in FIG. 1 is mostly designed for a telephone conversation between a user and a remote partner and not for a situation where the user such as the hearing impaired user or traveller performs a conversation at the same location. The conventional IP Captioned Telephone Service system of FIG. 1 furthermore has the drawback that it does not take into account the language capabilities of the user U, the communication partner CP and the communication assistant CA. For example, the user U or the communication partner CP might speak another language than the communication assistant CA so that the communication assistant CA is not capable to revoice correctly the spoken language of the communication partner CP. Furthermore, it might happen that although the communication partner CP and the communication assistant CA speak the same language the user U such as the hearing impaired user or travelling person are not able to speak this language. Moreover, the conventional system as shown in FIG. 1 does not take into account where or at which location the local face-to-face communication between a user U such as a travelling person and his communication partner CP does take place. The system shown in FIG. 1 is e.g. not suited for a user U such as a hearing impaired user or travelling businessman to perform a face-to-face personal conversation with a communication partner CP on the street or in a shop. Since the language abilities of the user U and the other party CP as well as the communication assistant CA are not taken into account the conventional system of FIG. 1 does not work in many situations where the language abilities of the communication assistant CA does not match the language abilities of the user U and his communication partner CP. Furthermore the conventional system of FIG. 1 does not allow the user such as a travelling person or hearing impaired user touse his telephone for a face-to-face conversation with another person, for example in a shop or when consulting a doctor in a foreign country.

Accordingly, it is an object of the present invention to provide a method and a system for a reliable transcription of spoken language in a face-to-face conversation between a user and his communication partner.

This object is achieved by a method comprising the steps of claim 1.

The invention provides a method for transcription of spoken language into continuous text for a user comprising the steps of:

(a) inputting spoken language of at least one user or of a communication partner of the at least one user into a mobile device of the respective user, wherein the input spoken language of the user is transported within a corresponding stream of voice over IP data packets to a transcription server;

(b) transforming the spoken language transported within the respective stream of voice over IP data packets into continuous text by means of a speech recognition algorithm run by said transcription server, wherein said speech recognition algorithm is selected depending on a natural language or dialect spoken in the area of the current position of said mobile device; and (c) outputting said transformed continuous text forwarded by said transcription server to said mobile device of the respective user or to a user terminal of the respective user in real time, (d) wherein streams of voice over IP data packets transporting said spoken language received by said transcription server (7) from said mobile device (2) are switched to terminals (8) of operators to which the spoken language is output and which re-voice the spoken language for speech recognition by said selected speech recognition algorithm (SRA) run by said transcription server (7).

Since according to the method of the present invention a speech recognition algorithm is selected depending on a natural language or dialect spoken in the area of a current position of the respective mobile device for converting the spoken words into text the accuracy and speed of the conversion is increased significantly.

In a possible embodiment of the method according to the present invention the current position of the mobile device of the user is determined on the basis of an IP-address assigned to the respective mobile device.

In a further embodiment of the method according to the present invention the current position of the mobile device of the user is determined on the basis of cell information data provided by a mobile telephone system.

In another embodiment the current position of the mobile device is determined by means of a GPS unit integrated into the mobile device.

A further possibility for determining the current position of the mobile device is that the user inputs his current position or location on request into his mobile telephone or mobile device.

In a possible embodiment of the method according to the present invention the transformed continuous text is translated by means of a text translation algorithm into a target language according to a user profile of the respective user or according to a target language selection performed by the respective user.

In this embodiment it is possible that the user and the communication partner can use different languages in their face-to-face conversation.

In a possible embodiment of the method according to the present invention streams of voice over IP data packets transporting the spoken language received by the transcription server from the mobile device are switched to terminals of operators or communication assistants to which a spoken language is output and which repeat or revoice the spoken language for speech recognition by the selected speech recognition algorithm run by said transcription server.

This embodiment provides the advantage that a suitable communication assistant CA is selected so that the accuracy and speed for performing the speech recognition is increased.

In an embodiment of the method according to the present the switching of the streams of voice over IP data packets to the terminals of the operators or communication assistants is performed depending on a natural language or dialect spoken in the area of the current position of said mobile device.

In a possible embodiment of the method according to the present invention the user or communication partner from whom a stream of voice over IP data packets originates is indicated in the respective stream of voice over IP data packets.

In a possible embodiment of the method according to the present invention the transformed continuous text is recorded by the transcription server.

In this embodiment the continuous text of the conversation is available for later use and might be downloaded or sent by an email to the user.

The invention further provides a system for a transcription of spoken language into continuous text for a user comprising:

at least one mobile device into which spoken language of at least one user or of a communication partner of the at least one user is input, wherein the input spoken language of the user is transported within a corresponding stream of voice over IP data packets to a transcription server where the transported spoken language is transformed by means of a speech recognition algorithm into continuous text forwarded to said mobile device or to a terminal of the respective user to be output to the respective user in real time, wherein said speech recognition algorithm is selected depending on a natural language or a dialect spoken in the area of the current position of the mobile device of the respective user, wherein the transcription server comprises a switching unit which switches the stream of received voice over IP data packets received from a mobile device of a user to terminals of operators depending on the area of the current position of the mobile device, wherein the spoken language transported within the stream of voice over IP data packets is switched to a terminal of an operator speaking a natural language or dialect of the area of the current position of said mobile device and repeating the spoken language received within said stream of voice over IP data packets for speech recognition by said selected speech recognition algorithm run by the transcription server.

In a possible embodiment of the system according to the present invention the current position of the mobile device is indicated by an IP-address assigned to said mobile device.

In an alternative embodiment of the system according to the present invention the current position of the mobile device is indicated by cell information data of a mobile telephone system.

In a further embodiment of the system according to the present invention the current position is determined by an integrated GPS unit of the mobile device.

In a further embodiment of the system according to the present invention the current position of the mobile device is determined in response to an input of the user.

In an embodiment of the system according to the present invention the mobile device is connected to the transcription server via an access network and the interne.

The invention further provides a transcription server for transcription of spoken language into continuous text for a user comprising a speech recognition unit which transforms spoken language received by the transcription server within at least one stream of voice over IP data packets from a mobile device of a user into continuous text by means of a speech recognition algorithm which is selected depending on a natural language or dialect spoken in the area of the current position of the mobile device, wherein the transcription server comprises a switching unit which switches the stream of received voice over IP data packets received from a mobile device of a user to terminals of operators depending on the area of the current position of the mobile device, wherein the spoken language transported within the stream of voice over IP data packets is switched to a terminal of an operator speaking a natural language or dialect of the area of the current position of said mobile device and repeating the spoken language received within said stream of voice over IP data packets for speech recognition by said selected speech recognition algorithm run by the transcription server.

In a possible embodiment of the transcription server according to the present invention the transcription server further comprises a translation unit which translates the text generated by the speech recognition unit into a target language by means of a translation algorithm selected according to a user profile of the user or according to a selection performed by the user.

The invention further provides a mobile device for a transcription of spoken language into continuous text for a user comprising:

input means for inputting spoken language of at least one user or of a communication partner of the at least one user, wherein said spoken language is transported within at least one stream of voice over IP data packets to a central transcription server;

output means for outputting in real time continuous text generated by said transcription server by means of a speech recognition algorithm on the basis of the spoken language transported within a stream of voice over IP data packets received by the transcription server from the input means;

wherein the speech recognition algorithm is selected depending on a natural language or dialect spoken in the area of the current position of the mobile device, (d) wherein streams of voice over IP data packets transporting said spoken language received by said transcription server (7) from said mobile device (2) are switched to terminals (8) of operators to which the spoken language is output and which re-voice the spoken language for speech recognition by said selected speech recognition algorithm (SRA) run by said transcription server (7).

In an embodiment of the mobile device according to the present invention the current position of the mobile device is indicated by an IP address assigned to the mobile device.

In an alternative embodiment of the mobile device according to the present invention the current position of the mobile device is determined on the basis of cell information data of a mobile telephone system.

In a further embodiment of the mobile device according to the present invention the mobile device comprises an integrated GPS unit for determining the current position of the mobile device.

In a possible embodiment the current position of the mobile device is determined in response to an input of the user via a user interface of the mobile device.

In a possible embodiment of the mobile device according to the present invention the input means is formed by a headset comprising at least one microphone for detecting spoken language.

In a possible embodiment of the mobile device according to the present invention the output means of the mobile device is formed by at least one head-up display for displaying the continuous text to the user.

In a possible embodiment the input means comprises a microphone connected to the mobile device via wireless link such as Bluetooth.

In a possible embodiment of the mobile device according to the present invention the mobile device is formed by a mobile telephone, a mobile smart phone, a laptop, a PDA, a mobile internet device (MID) or a palm device.

The transcription system according to the present invention is very flexible and can be used for many different applications.

In a possible embodiment the transcription system according to the present invention can be used to generate continuous text for a hearing impaired or deaf user in response to spoken language input by communication partner of the hearing impaired user into said mobile device of said hearing impaired user or input into a terminal of the communication partner connectable to the transcription server.

In a possible embodiment the communication partner can also be a hearing impaired user having a mobile device to receive messages.

In a further possible application of the transcription system according to the present invention the transcription system can be used to generate subtitles for movies, news reports or live TV shows by a user, in particular a movie dubbing dramaturge or reporter, speaking comments into the mobile device being displayed as subtitles in real time on a screen.

In a further broad application of the transcription system according to the present invention said transcription system can be used to generate a translated continuous text for a travelling user travelling in a foreign country with another local natural language or dialect in response to a spoken language input by a communication partner of the travelling user into the mobile device of the travelling user to be displayed in real time to the travelling user on a display of his mobile device.

In the following embodiments of the method and system according to the present invention are described with reference to the enclosed figures.

Figure 1:
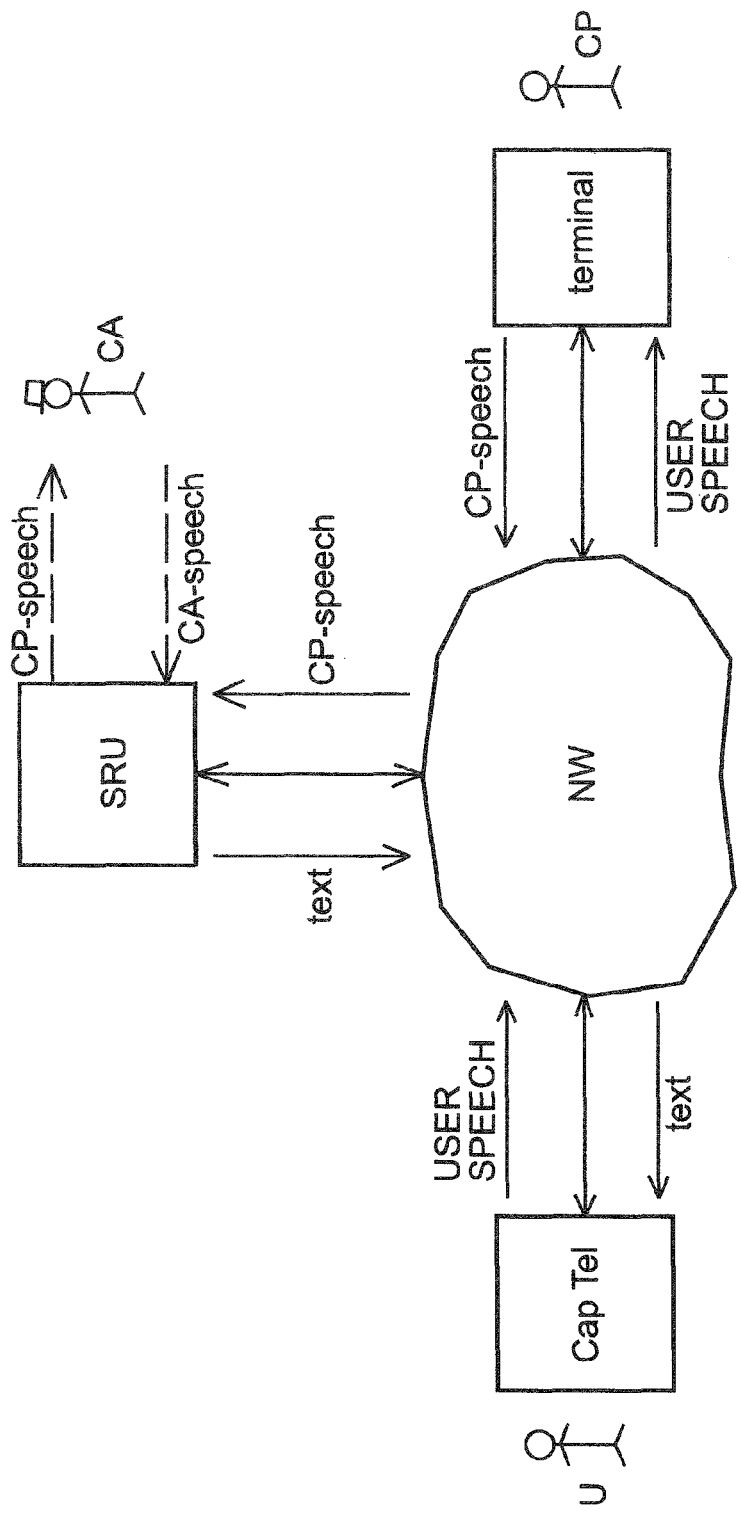
FIG. 1 shows a diagram for illustrating a conventional IP captioned telephone service system.
Figure 2:
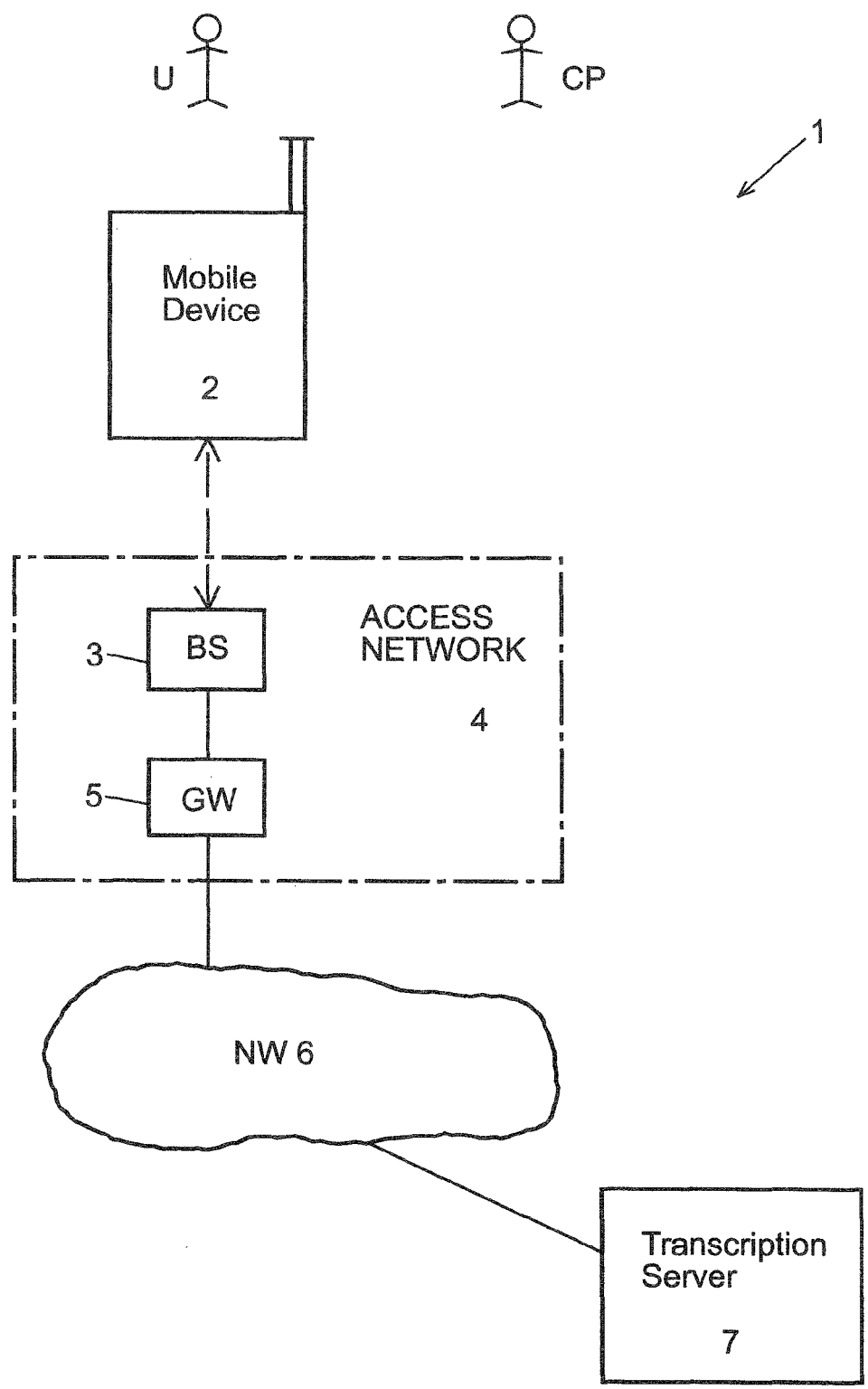
FIG. 2 shows a diagram for illustrating a basic configuration of a transcription system according to an embodiment of the present invention.

As can be seen from FIG. 2 a transcription system 1 for transcription of spoken language into continuous text for a user U comprises in a basic configuration at least one mobile device 2 into which spoken language or speech of at least one user U or of a communication partner CP is input by means of a microphone. The mobile device 2 can be a mobile phone of the user. The mobile device 2 can also be a mobile smart phone, a laptop, a PDA, a mobile internet device MID or a palm device of the user.

In the embodiment shown in FIG. 2 the mobile device 2 has a transceiver for establishing a wireless link to a base station 3 of an access network 4 which is connected by means of a gateway 5 to a communication network 6 which in turn is connected to a transcription server 7. The network 6 can comprise a plurality of inter-connected networks such as the internet. The network 6 can also be a local area network LAN or a wide area network. The WLAN access network 4 can be an access network of a mobile telephone system. Spoken language or speech input by the user U or his face-to-face communication partner CP into a microphone of the mobile device 2 is converted by an analogue digital converter ADC into digital data. After conversion of the analogue voice signal into a digital data format a compression of the data can be performed. Then the data can be formated into internet protocol (IP) data packets for transmission over the network 6. This process can be reversed at the receiving end, i.e. at the transcription server 7. The input spoken language of the user U is transported within a corresponding stream of voice over IP data packets to the transcription server 7 where the transported spoken language data is transformed by means of a speech recognition algorithm SRA into continuous text forwarded by the transcription server 7 via the network 6 back to the mobile device 2 as shown in FIG. 2 or to another terminal of the respective user U to be output to the respective user in real time. The speech recognition algorithm SRA employed by the transcription server 7 is selected in the transcription system 1 according to the present invention depending on a natural language or a dialect spoken in the area of the current position of the mobile device 2 of the respective user U.

In a preferred embodiment of the transcription system 1 according to the present invention as shown in FIG. 2 the current position of the mobile device 2 is indicated by an IP address assigned to the mobile device 2. The IP-address of the mobile device 2 can be assigned dynamically for example when the mobile device 2 is switched on.

In an alternative embodiment the current position of the mobile device 2 is derived from cell information data of a mobile telephone system. This cell information data can be provided by the access network 4 run by the mobile telephone system provider. In a further embodiment the mobile device 2 has an integrated GPS unit detecting the current position of the mobile device 2 by means of a satellite signal. In a further embodiment the current position of the mobile device 2 is derived from input data input by the user U into a user interface of the mobile device 2. For example the user U can input an address of his current location which is translated into the current position of the mobile device 2.

Figure 3:
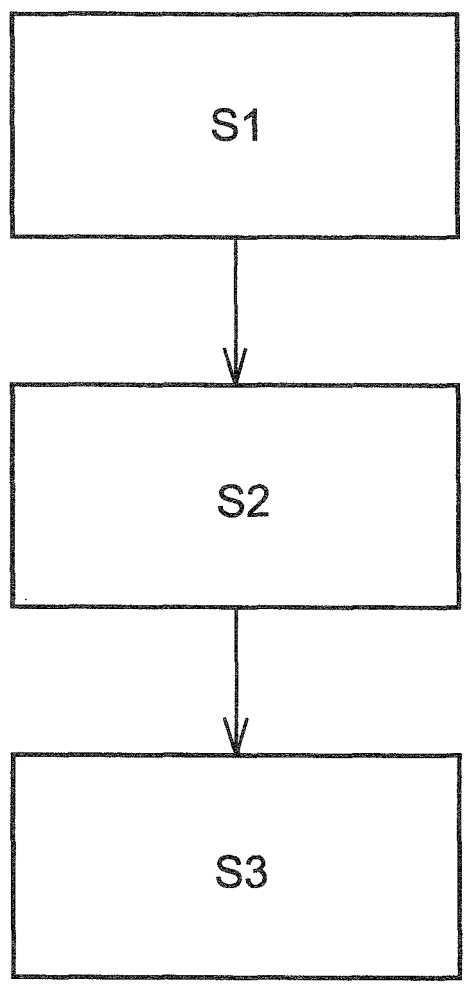
FIG. 3 shows a flow diagram of a possible embodiment of a transcription method according to the present invention.

FIG. 3 shows a flow chart of a possible embodiment of the method for transcription of spoken language into continuous text for a user U according to the present invention.

In a first step S1 spoken language of at least one user U or of a communication partner CP of the user U is input into the mobile device 2 of the respective user, for example by means of a microphone. The input analogue audio signal is converted into digital data, processed by a data processing unit within the mobile device 2 and then transported within a corresponding stream of voice over IP data packets to the transcription server 7 via the network 6. The transcription server 7 can be located for example in a central transcription computer system CTCS. The mobile device 2 can be a mobile internet apparatus such as a smart phone, netbook having a UMTS card or a WLAN connection.

In a further step S2 the spoken language transported within the respective stream of voice over IP data packets is transformed into continuous text by means of a speech recognition algorithm SRA run by the transcription server 7. The speech recognition algorithm SRA used by the transcription server 7 is selected depending on a natural language or dialect spoken in the area of the current position of the mobile device 2. In a possible embodiment the transcription server 7 evaluates the current assigned IP address of the mobile device 2 and matches this W address with data stored in a geo coded database to determine the current position of the mobile IP device 2. The IP address assigned to the mobile device 2 can be trans-ported in a possible embodiment along with the voice over W data packets or within a header of the voice of an IP data packets. In an alternative embodiment the transcription server 7 evaluates cell information data of a mobile telephone system provided by a database of a mobile telephone system provider. In a further embodiment the transcription server 7 receives GPS data of the mobile device 2 and evaluates the coordinates to determine the current position of the mobile device 2. After the selection of a suited speech recognition algorithm SRA provided for the natural language or dialect spoken in the determined area of the current position of the mobile device 2 the received spoken language data is transformed by means of the selected speech recognition algorithm SRA into continuous text. In a possible embodiment of the transcription server 7 has access to different speech recognition algorithms SRA provided for different areas.

In a third step S3 the transformed continuous text is transmitted by the transcription server 7 to the mobile device 2 of the user U or to a user terminal of the respective user U in real time. The transformed continuous text can be displayed on a display of the mobile device 2 to the user.

Figure 4:
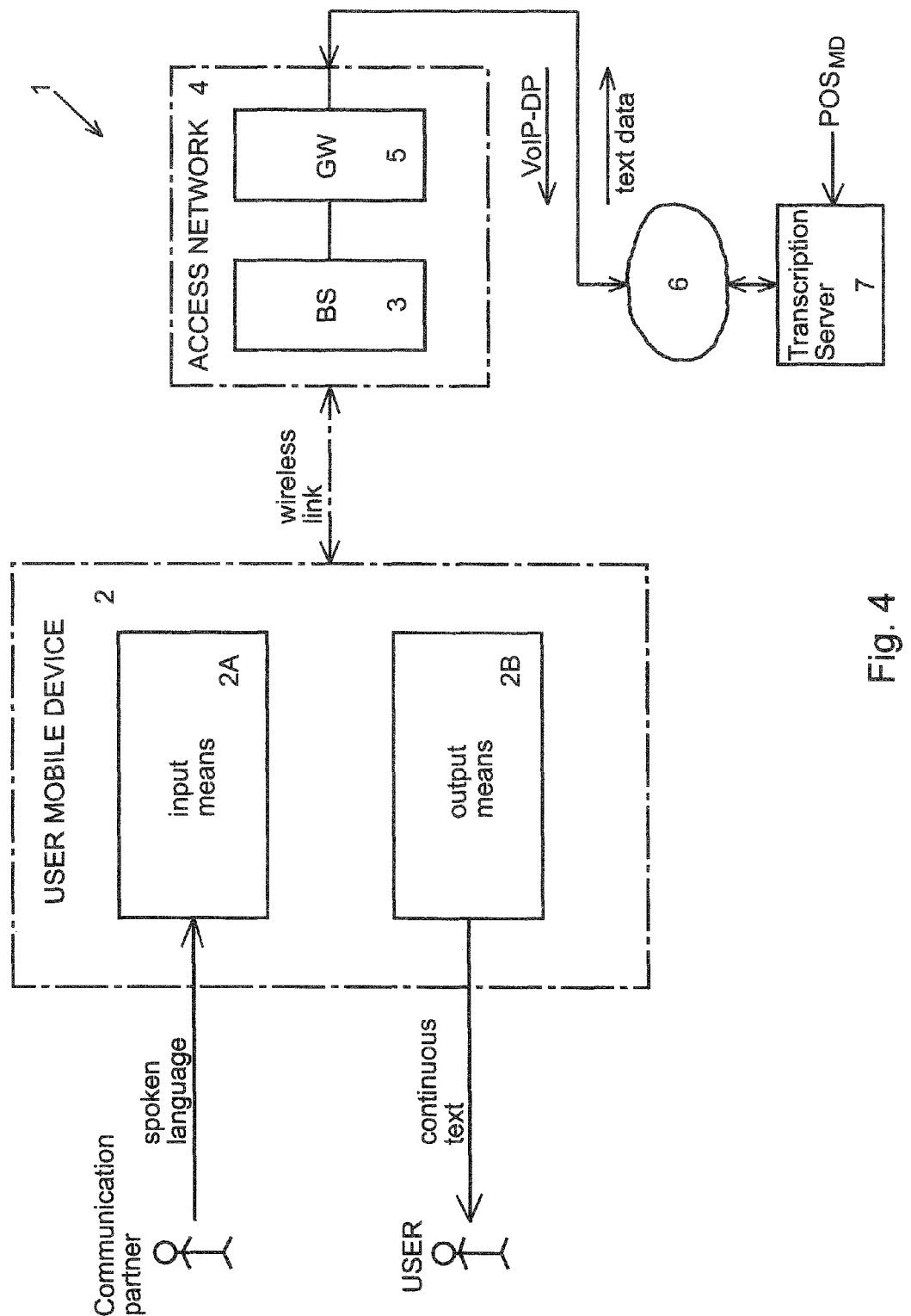
FIG. 4 shows a diagram for illustrating a possible embodiment of the transcription system according to the present invention.

FIG. 4 shows a further diagram for illustrating a method and system for transcription of spoken language according to the present invention. As can be seen from FIG. 4 the user mobile device 2 comprises input means 2A for inputting spoken language of at least one user U or of a communication partner CP of the at least one user. The input means 2A can comprise one or several microphones, analogue digital converters and data processing units. The input means 2A might be integrated into a headset. The user mobile device 2 further can comprise output means 2B for displaying continuous text to the user U. The output means 2B are provided for outputting in real time continuous text generated by the transcription server 7 by means of the to selected speech recognition algorithm SRA. In a possible embodiment the output means 2B can be formed by a head-up display for displaying the continuous text to the user. The user mobile device 2 as shown in FIG. 2 comprises a transceiver for establishing a wireless link to the base station 3 of the access network 4.

In the embodiment shown in FIG. 4 the input means 2A and the output means 2B are integrated in one user mobile device 2 such as a mobile telephone. In other embodiments the input means 2A and the output means 2B can form separate devices not integrated in the same apparatus. In a possible embodiment the input means 2A can for example be a headset with a microphone having a first IP-address and the output means 2B can be a head-up display having another IP-address.

In the embodiment shown in FIG. 4 a communication partner CP of the user inputs spoken language into a microphone of the input means 2A which is transformed into continuous text displayed to the user U by means of the output means 2B. The user U and the communication partner CP can perform a face-to-face conversation even if the user U is deaf or hard of hearing. For example, the user U can bring his user mobile device 2 as shown in FIG. 4 to a consultant such as a doctor for inquiring about his health. In further embodiments the communication partner CP such as a doctor can use a separate device or apparatus in his office to input the spoken language to the system. In this embodiment the terminal or device of the communication partner can be connected directly to the network 6 to provide voice of IP data packets to the transcription server 7.

Figure 5:
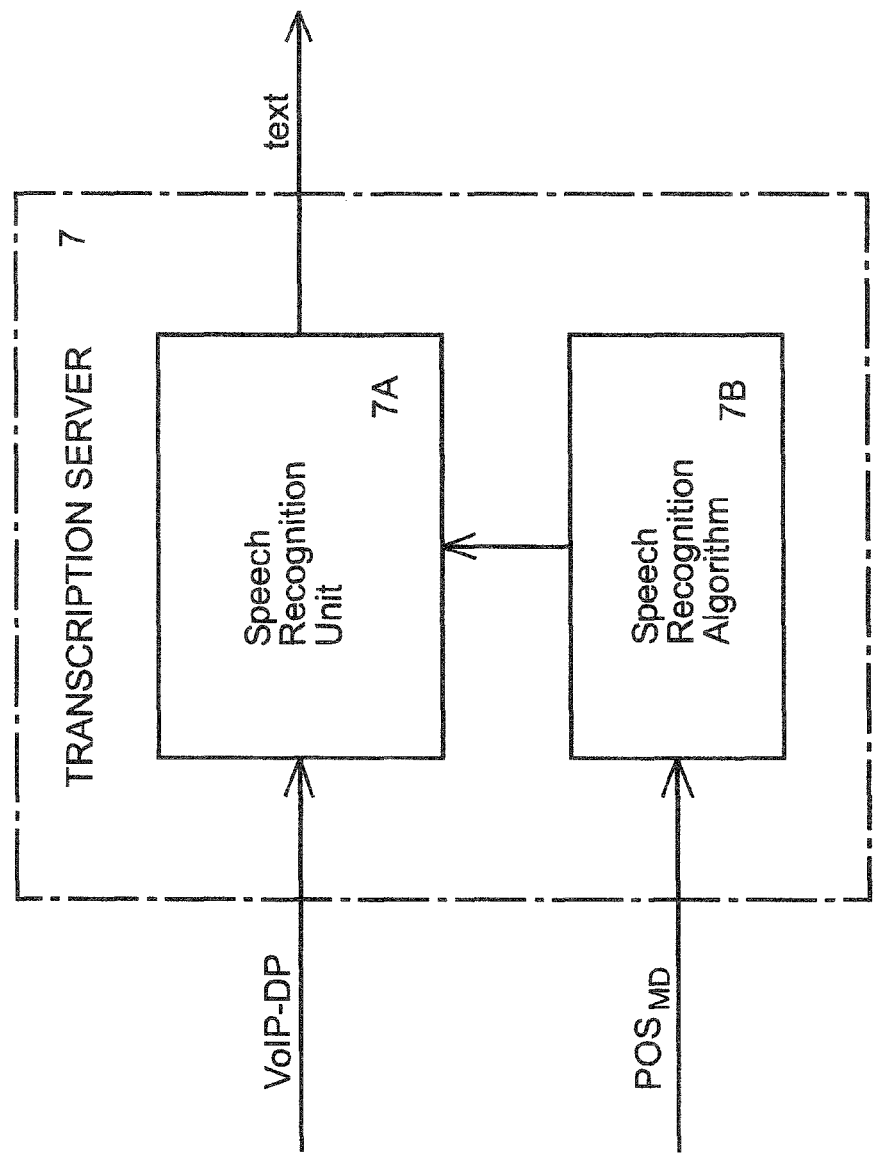
FIG. 5 shows a block diagram of a possible embodiment of a transcription server according to the present invention.

FIG. 5 shows a block diagram for a possible embodiment of a transcription server 7 as employed by the transcription system 1 according to the present invention. In this embodiment the transcription server 7 comprises a speech recognition unit 7A which can load a speech recognition algorithm SRA from a database or memory 7B. The speech recognition unit 7A of the transcription server 7 transforms spoken language received by the transcription server 7 within at least one stream of voice over IP data packets from a mobile device 2 of a user U into continuous text by means of speech recognition algorithm SRA which is selected depending on a natural language or dialect spoken in the area of the current position of the mobile device 2.

Figure 6:
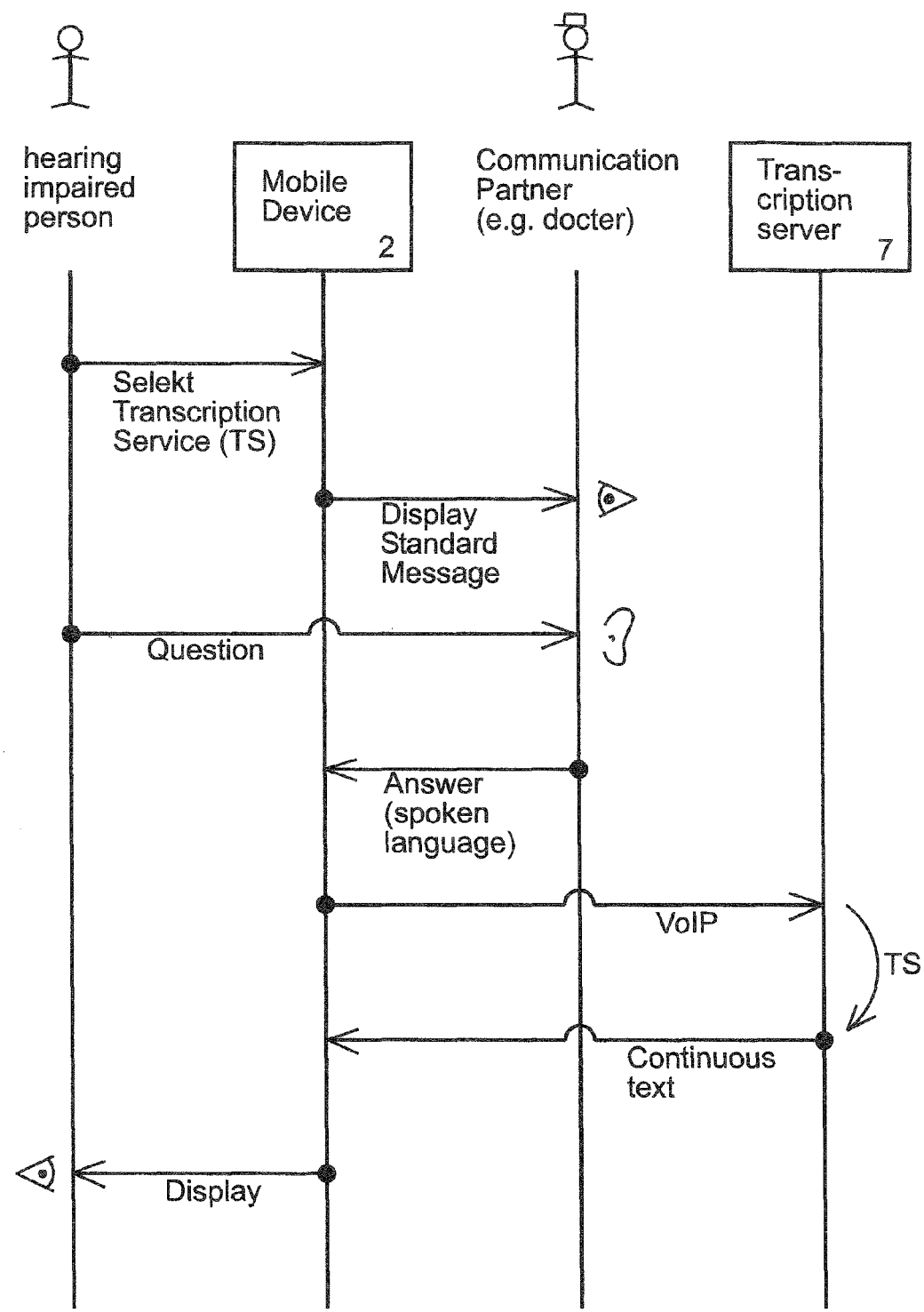
FIG. 6 shows a signal diagram for illustrating a possible application of the transcription system according to the present invention.

FIG. 6 shows a signal diagram for illustrating an exemplary use of the method and system for transcription or spoken language into continuous text according to the present invention. In the given example a hearing impaired person wants to communicate with a not hearing impaired person such as a doctor in a face-to-face conversation. In the given example the communication partner CP such as a doctor does not have any facilities of his own for a transcription service. In the given example the hearing impaired person brings his user mobile device 2 is to the office of the communication partner CP and activates a transcription service TS by means of a user interface. For example the hearing impaired person U selects a transcription service TS by using a manu displayed to the user U on a display of the mobile device 2. In another embodiment the hearing impaired person activates the transcription service TS simply by pressing a button of an input unit of the mobile device 2. After having selected the transcription service TS a standard message can be displayed on the display of the mobile device 2 to the communication partner CP, i.e. the doctor. The standard message can for example inform the doctor CP that the person in front of him is a hearing impaired person which would like to communicate with him by use of a transcription service TS which translates his words into continuous text. Then the hearing impaired person U can pose a question to the doctor CP, for example about his health condition. The communication partner CP inputs an answer in spoken language into the microphone of the mobile device 2 given to the doctor CP by the hearing impaired person U. The spoken language is converted into digital data and transported in voice of IP data packets to the transcription server 7 via a network 6 such as the internet. In the transcription server 7A recognition algorithm SRA is selected depending on a natural language or dialect spoken in the area of the current position of the mobile device 2. By means of the selected speech recognition algorithm SRA run by the transcription server 7 the spoken language of the doctor CP transported within a corresponding stream of voice over IP data packets is transformed into continuous text. The text data is forwarded by the transcription server 7 via the network 6 back to the mobile device 2 of the hearing impaired person U and displayed on a display of the mobile device 2 to the hearing impaired person U. Accordingly the hearing impaired person user U can understand the answer given by the doctor CP to his question and can ask the next question or give a comment of his own.

Figure 7:
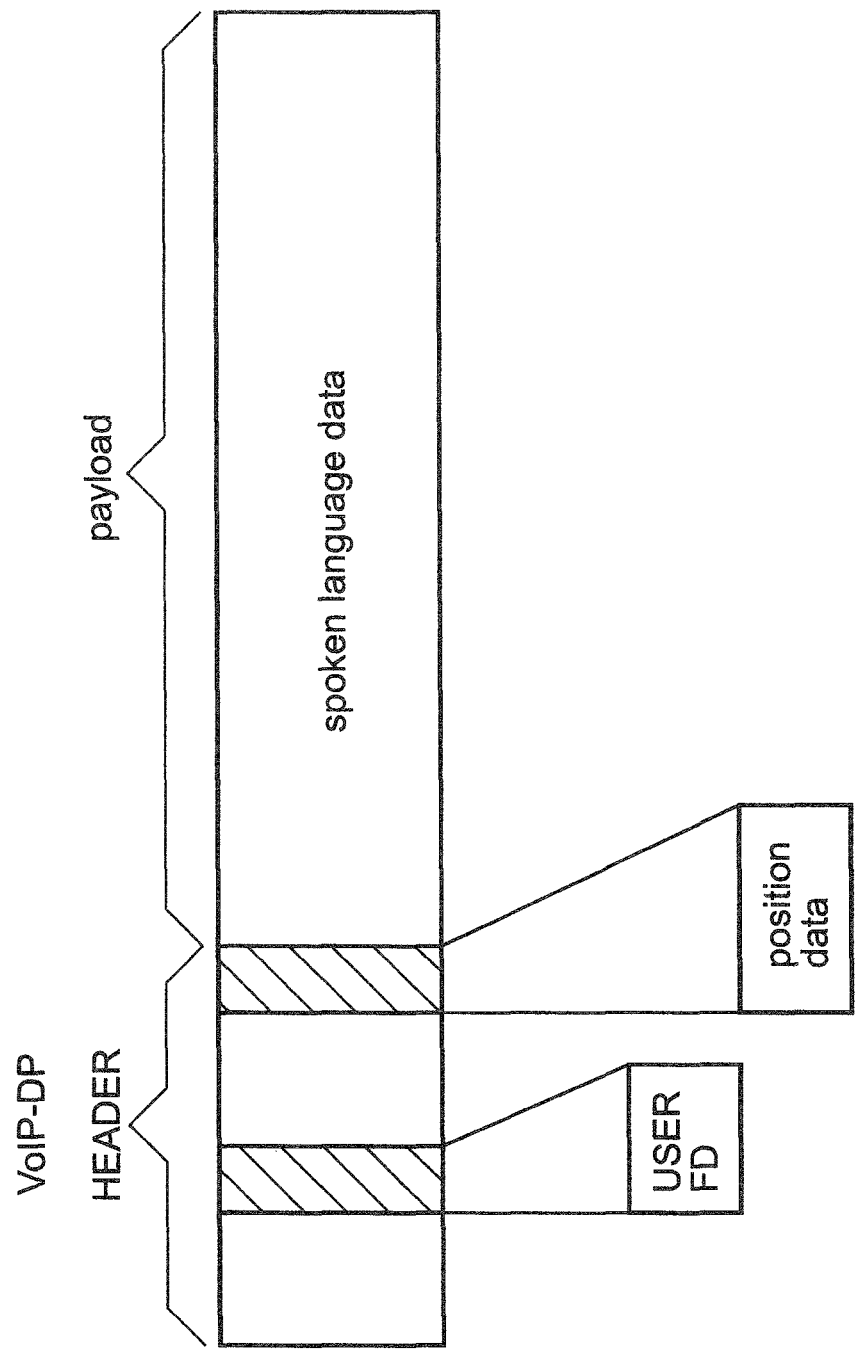
FIG. 7 shows a diagram for illustrating the functionality of the transcription method according to the present invention.

FIG. 7 shows a possible data structure of a voice over IP data packet for illustrating a possible embodiment of the system 1 according to the present invention. The voice of IP data packets comprise a header and payload data. The payload data is foimed by the spoken language data of the speaking person such as the communication partner CP. In a possible embodiment the header of the voice over IP data packet carries position data of the mobile device 2 and a user ID. The position data can indicate the current position of the mobile device 2 of the user U. In a possible embodiment the position data correspond to an assigned IP address of the mobile device 2 evaluated by the transcription server 7 to determine the current position of the mobile device 2. The user ID carried in the header can indicate the user U such as the hearing impaired person using the transcription service TS. Depending on the transported user ID the is transcription server 7 can have access to a user profile of the respective user U to derive further information such as target language spoken by the user. The position of the mobile device 2 can be transported as shown in FIG. 7 as header data of the voice over IP data packets but also by means of a separate information channel.

Figure 8:
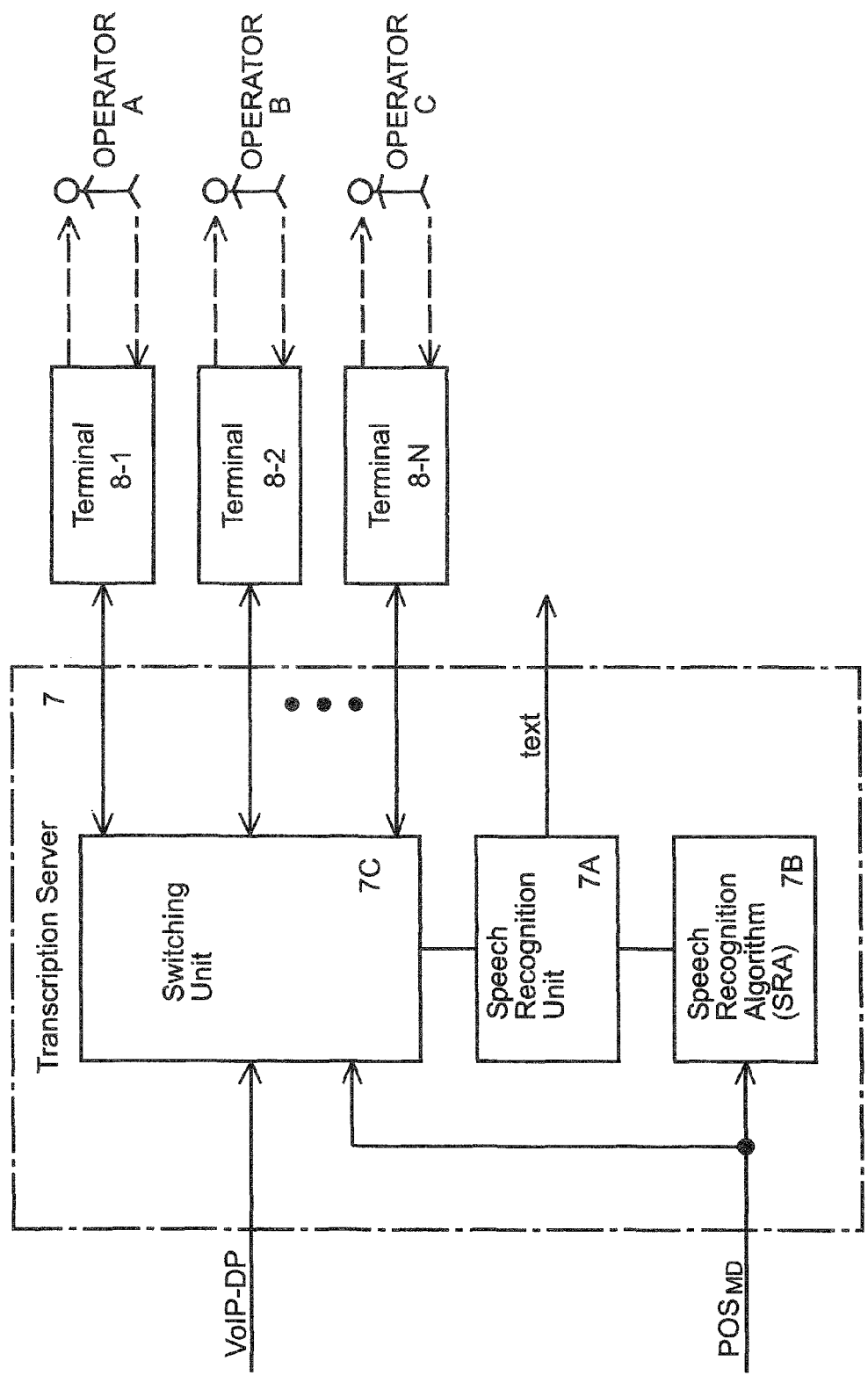
FIG. 8 shows a possible embodiment of the transcription server according to the present invention.

FIG. 8 shows possible embodiment of the transcription server 7 as employed by the system 1 according to the present invention. In the embodiment shown in FIG. 8 the transcription server 7 comprises a speech recognition unit 7A loading a speech recognition algorithm SRA from a database or memory 7B as well as a switching unit 7C. The switching unit 7C switches the stream of received voice over IP data packets received from a mobile device 2 of the user U to different terminals 8-1, 8-2, . . . , 8-N of operators or communication assistants CA depending on the detected area of the current position of the mobile device 2. If for example the conversation explained with reference to FIG. 6 between a hearing impaired person and a doctor takes place in a foreign country such as France the answer of this doctor given in French will be re-voiced by a suited operator or communication assistant speaking French. The switching unit 7 determines that the current position of the mobile device 2 is an area where the native language is French and switches the voice over IP data packets received from the communication partner CP to the terminal 8-I where the operator is located speaking the matching native language, i.e. in the given example French. The re-voiced language by the trained operator is then forwarded by the switching unit 7C to the speech recognition unit 7A which transforms the re-voiced spoken language of the operator into continuous text by use of a speech recognition algorithm SRA which can also be selected depending on the current position of the mobile device 2. The generated continuous text can then be forwarded to the hearing impaired person U and the French text is displayed on a display of the mobile device 2 so that the hearing impaired person can read it.

Figure 9:
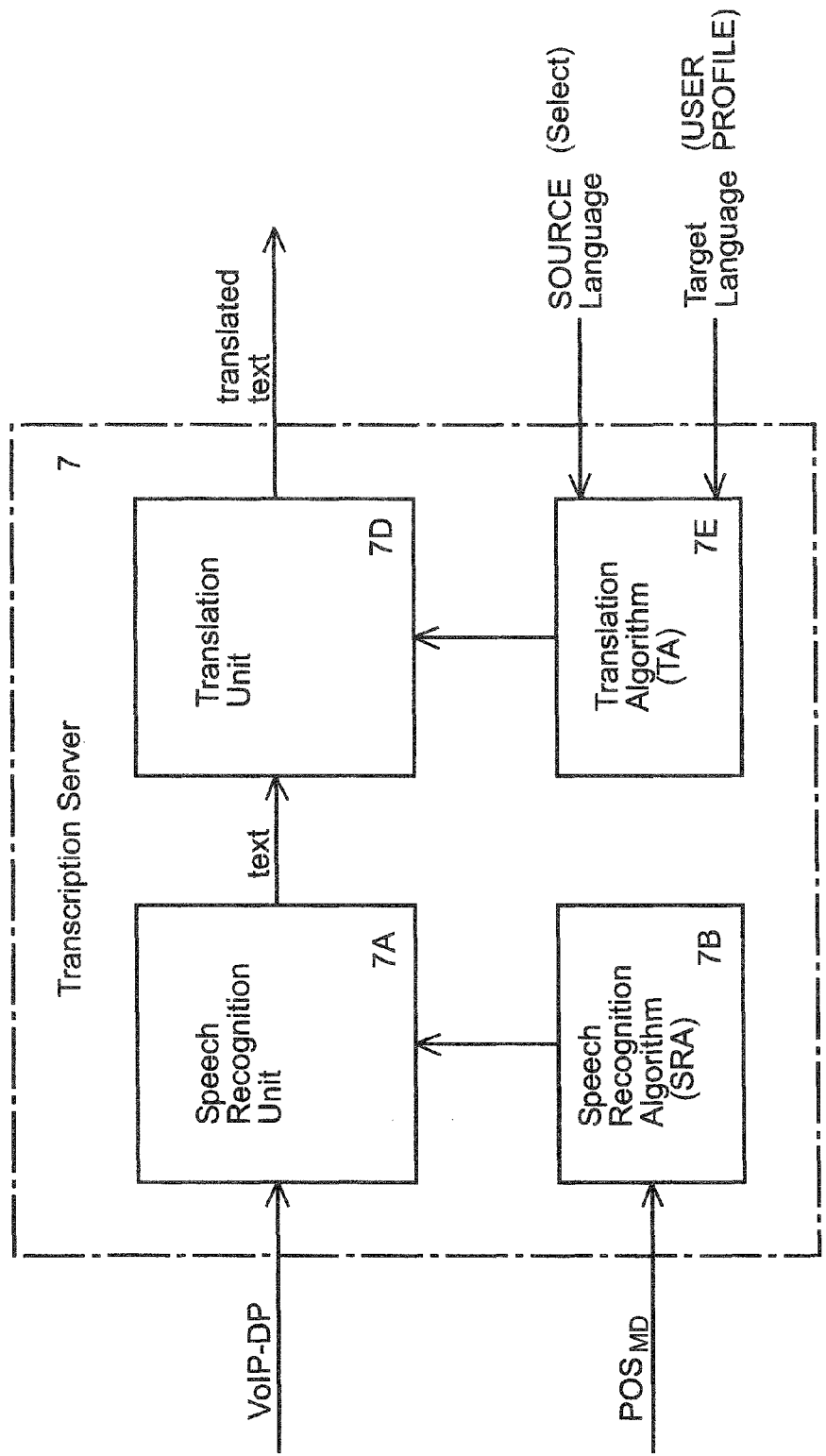
FIG. 9 shows a block diagram of a possible embodiment of the transcription server according to the present invention.

FIG. 9 shows a further embodiment of a transcription server 7 as employed by the system 1 according to the present invention. In the shown embodiment the transcription server 7 further comprise a translation unit 7D having access to a database or memory 7E storing different kinds of translation algorithms. In a possible embodiment the transcription server 7 shown in FIG. 9 can also comprise a switching unit 7C as shown in FIG. 8. As can be seen in FIG. 9 the continuous text generated by the speech recognition unit 7A using the selected speech recognition algorithm SRA loaded from the memory 7B is supplied to a translation unit 7D trans-lating the continuous text by means of a translation algorithm loaded from the memory 7E. The translation unit 7D translates the text generated by the speech recognition unit 7A into the target language of the user U by means of the translation algorithm TA selected according to a user profile of the user U or according to a selection performed by the user U. In the embodiment as shown in FIG. 9 the target language is selected depending on the user profile of the user owning the mobile device 2. For example if the hearing impaired person being the owner of the mobile device 2 is a German native speaker the target language will be selected to be German. The source language is selected to be the language of the communication partner CP such as a doctor. In a possible embodiment the source language, for example French, is selected depending on the current position of the mobile device 2. For example if the mobile device 2 is currently located in Paris, the source language is selected automatically to be French. In another embodiment the user U such as a hearing impaired person can select the source language via a user interface of the mobile device 2. After the automatic or manual selection of the source and target language a translation of the generated text is performed by means of a suitable translation algorithm TA translating the text from the source language into the target language. Then, the translated text is forwarded by the transcription server 7 via the network 6 to the mobile device 2 and displayed on a screen of the mobile device 2 to the user U such as the hearing impaired person. By using a transcription server 7 as shown in FIG. 9 it is possible that a hearing impaired person or a user U consulting a French doctor can receive the answer of the doctor already translated into his native language such as Gelman. Accordingly, a hearing impaired person even with very limited knowledge of the French language can consult a doctor in a foreign country such as France.

Figure 10:
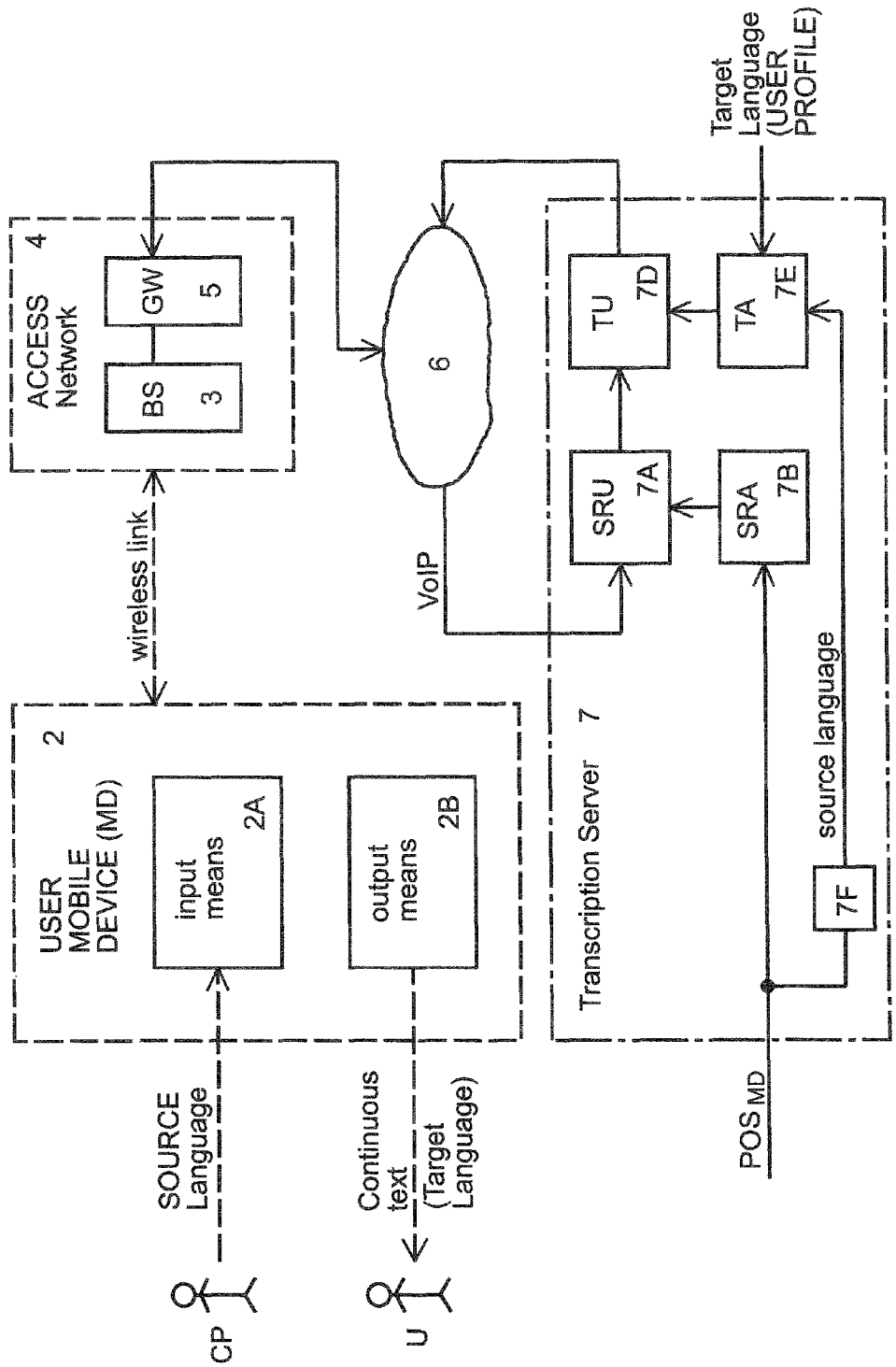
FIG. 10 shows a block diagram of a possible embodiment of the transcription system according to the present invention.

FIG. 10 shows a possible embodiment for a transcription server 7 as employed by the system 1 according to the present invention. In this embodiment the transcription server 7 comprises a further unit 7F which evaluates the current position of the mobile device 2 to derive automatically a source language for selection of a suitable translation algorithm stored in the data base 7E.

Figure 11:
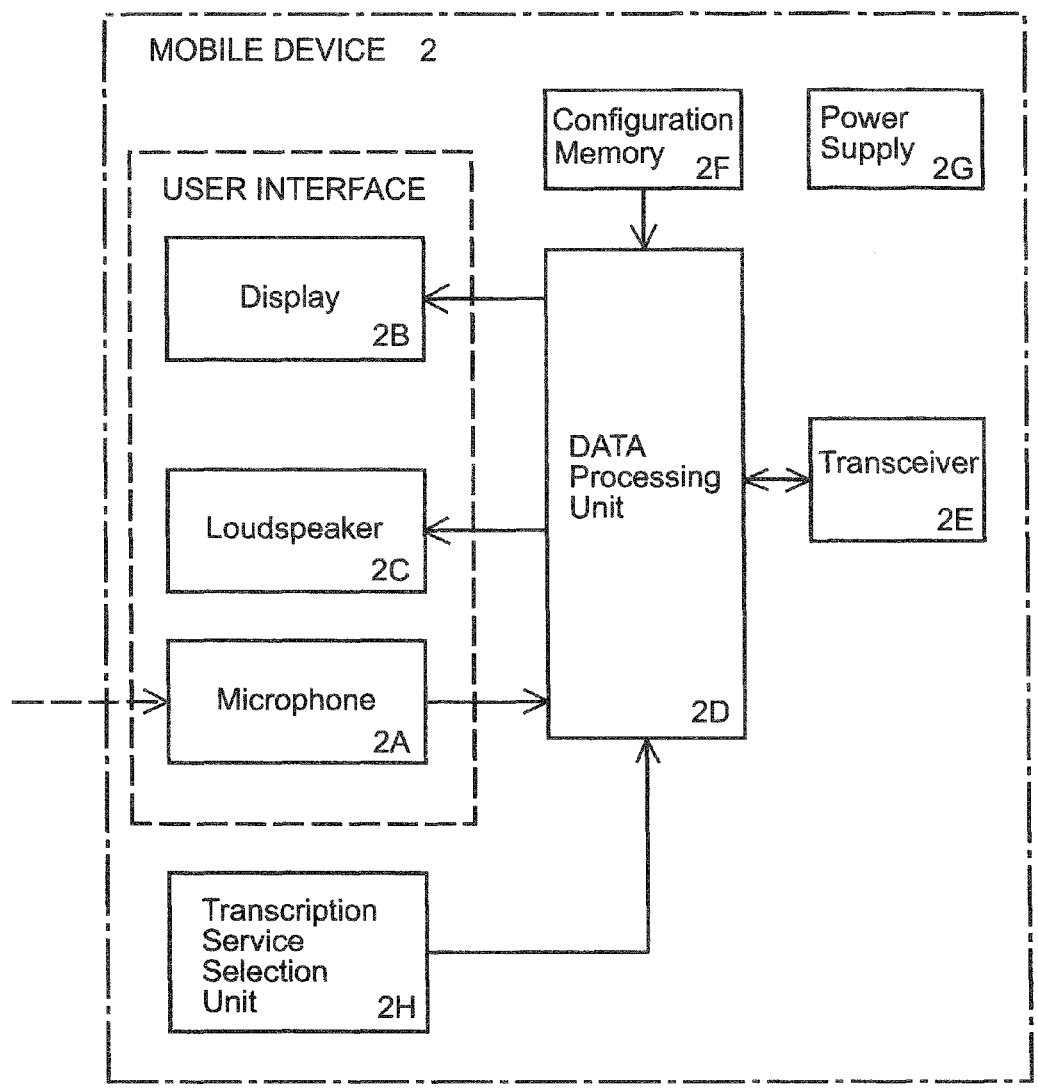
FIG. 11 shows a block diagram of a possible embodiment of a mobile device according to the present invention.

FIG. 11 shows a block diagram of a possible embodiment of a mobile device 2 according to the present invention as employed in the transcription system 1 according to the present invention. In the shown embodiment the mobile device 2 comprises a user interface comprising a display 2B as output means when displaying the generated continuous text to the user. The interface can further comprise a load speaker 2C and one or several microphones 2A for receiving spoken language to the transcribed. The user interface is connected to a data processing unit 2D such as a microprocessor. The data processing unit 2D can also comprise analogue digital converters ADC and digital to analogue converters DAC. The data processing unit 2D formats the converted data possibly after compression into voice over ID data packets which are sent via a transceiver 2E and a wireless link to the base station 3 of an access network 4. The mobile device 2 can comprise further units such as a configuration memory 2F and a power supply unit 2G.

In a possible embodiment the mobile device 2 can comprise a transcription service selection unit 2H. In this embodiment a user U can select different kinds of transcription services TS. For example, user U can select a simple transcription service where the spoken language of his communication partner CP is transformed in text by a speech recognition unit 7A using a selected speech recognition algorithm SRA as illustrated in connection with FIG. 5. As another option the user U can select a more sophisticated transcription service TS using the assistance of a operator or communication assistant CA re-voicing the spoken language as described in connection with the embodiment of FIG. 8. As a further option the user can select an even more sophisticated transcription service TS where the spoken language is not only revoiced but also translated into a target language as described in connection with the embodiments shown in FIGS. 9, 10.

Figure 12:
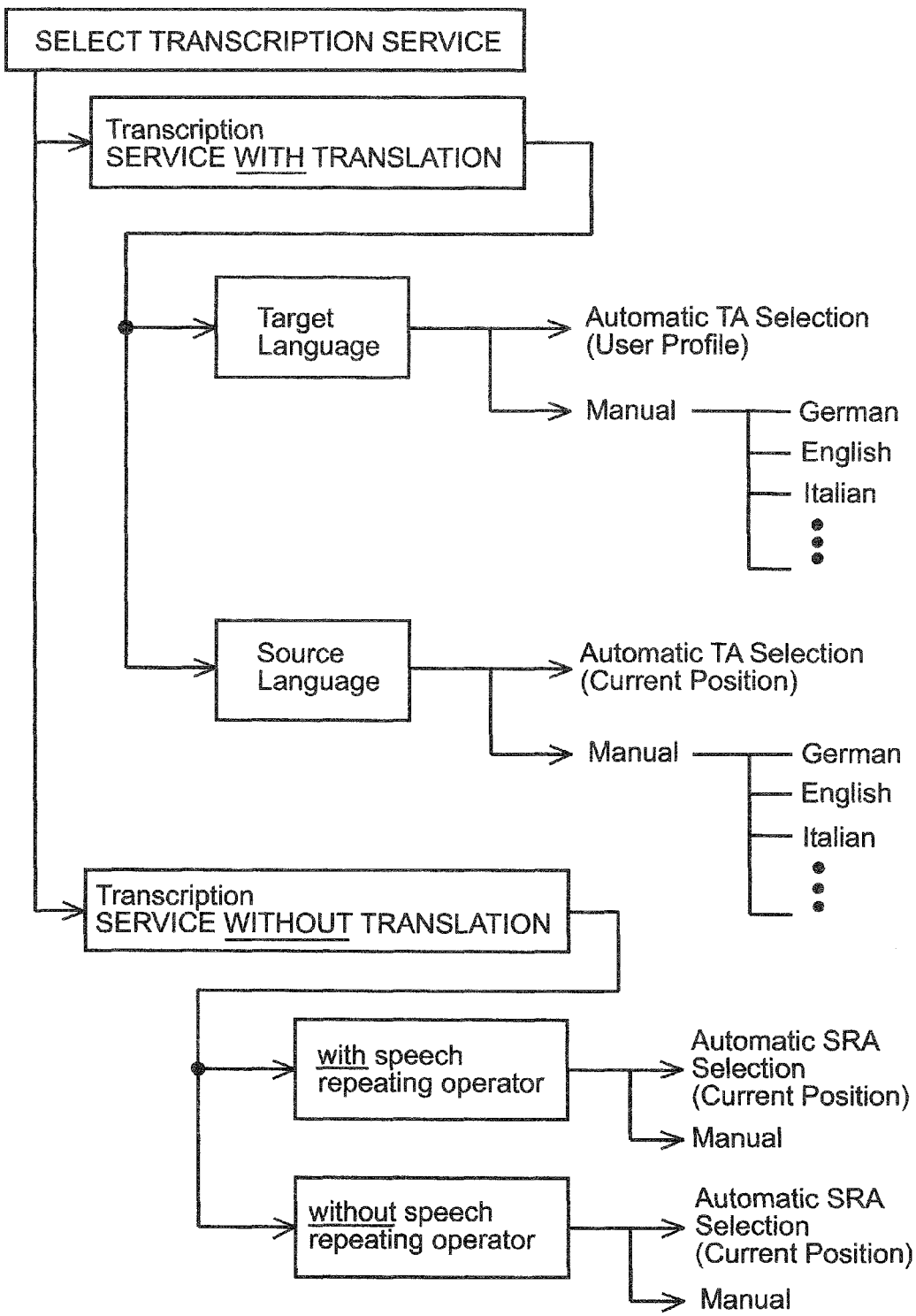
FIG. 12 shows a diagram for illustrating possible operation modes of a mobile device according to the present invention.

FIG. 12 shows a diagram to illustrate the selection of different operation modes by a user U selecting different kinds of transcription services TS by means of the transcription service selection unit 2H. In the given exemplary embodiment the user U can choose between a transcription service TS with translation and a transcription service TS without translation. In the shown example the user U can then select a target and a source language if he has decided for a transcription service with translation. In a possible embodiment the target language and the source language are selected automatically. As shown in FIG. 12 in a possible embodiment the translation algorithm selection can be performed automatically depending on the user profile of the user U if the user wishes to do so. Alternatively the user U can select the target language manually for example German, English or Italian. For configuration of the source language the user U can also perform a manual selection if he wishes to do so, for example between German, English and Italian. Alternatively the user U can choose to perform an automatic translation algorithm selection depending on the current position of his mobile device 2. If the user U selects an automatic translation algorithm selection in the menu and then travels from Munich to Rome the source language is automatically switched from German to Italian in the given example. If the user U furthermore chooses an automatic translation algorithm selection and the user is a German native speaker the target language is selected automatically to be German.

In the given example of FIG. 12 if the user U selects a transcription service TS without translation he might choose using a transcription service TS with a speech repeating operator revoicing the spoken language or a transcription service without the use of an operator or communication assistant re-voicing the spoken language. If the user opts for a transcription service employing a communication assistant CA he can for example decide between an automatic selection of the speech recognition algorithm SRA according to the current position of the mobile device 2 or a manual setting. The same applies for an elected transcription service without the use of a communication assistant. As can be seen from the diagram of FIG. 12 the user 2 can choose and select between different kinds of transcription services TS provided by the transcription server 7 and can perform a desired standard configuration according to his needs. The selected configuration can be stored in the configuration memory 2F as shown in FIG. 11.

The transcription system 1 according to the present invention can be used by a travelling person travelling to a country with another foreign language. The transcription system 1 according to the present invention is also suited for users who have no impairments but do not speak the local dialect or language of the respective region. A businessman travelling to Japan can use a transcription system 1 according to the present invention which generates a translated continuous text in his native language such as German when travelling through the foreign country, i.e. Japan. The user U or businessman can select a sophisticated transcription service using an operator or communication assistant speaking Japanese and performing furthermore a translation from Japanese into his native language. After having selected this transcription service the user U, i.e. the businessman can start a conversation with a Japanese local communication partner CP such as a cab driver or any other person on the street for example by directing a question to the Japanese cab driver. In a possible embodiment the question can be displayed on a display of the user mobile device 2 after it has been loaded from a dictionary. The displayed question can be for example in Japanese: "Where is the next airport?". The Japanese speaking cab driver answers in Japanese into the mobile device 2 of the businessman and his spoken answer is transported by voice over IP data packets to the transcription server 7. Since the businessman has selected a sophisticated transcription service TS including the service of an operator for communication assistant CA the answer of the Japanese cab driver is re-voiced by the trained operator to minimize the error rate during speech recognition. The speech recognition algorithm SRA used by the transcription server 7 is selected depending on the current position of the mobile device 2 and is therefore suited for the Japanese language. The Japanese text generated by the speech recognition unit 7A is then supplied to translation unit 7D since the businessman U has selected the sophisticated transcription service including a translation into his native language. The source language, i.e. Japanese, can be selected according to the current position of the mobile device 2. The target language, e.g. German, can be selected according to the user profile of the German businessman U. In this example the translation unit 7D uses a translation algorithm translating the Japanese text into German text. The German text is forwarded by the transcription server 7 in real time to the mobile device 2 of the user U and displayed on a display of his mobile phone. In this manner the German businessman U can converse with the Japanese cab driver CP in real time face-toface. In a possible embodiment standard questions to be displayed to the local communication partner CP can be loaded from a data base of the transcription server 7. Another option is that the user U has a basic knowledge of the local language and can formulate a simple question in the foreign language such as "Dove e il aeropoerto piu vicino?" ("Where is the airport?").

Figure 13:
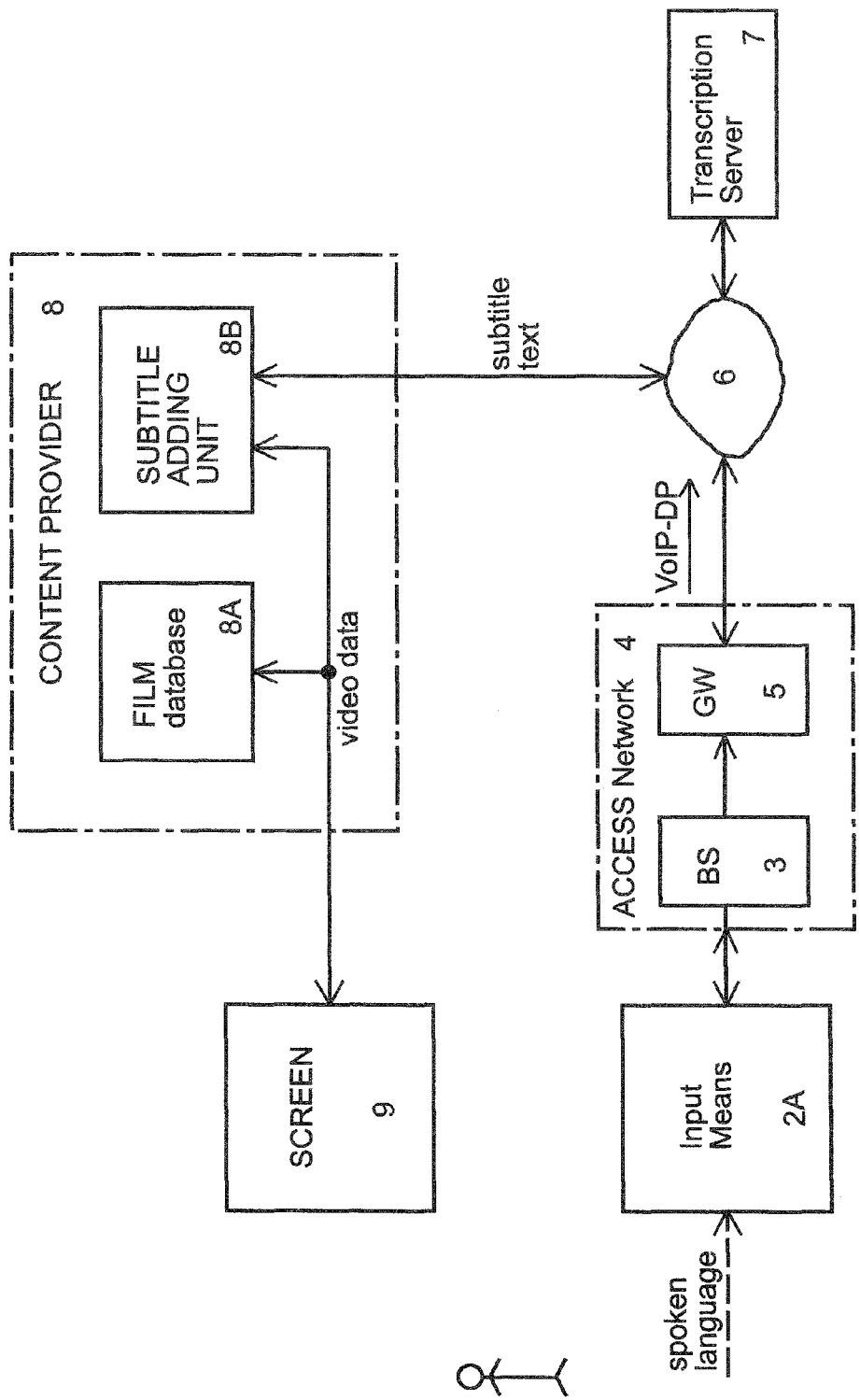
FIG. 13 shows an embodiment of the transcription system according to the present invention.

The transcription system 1 according to the present invention can also be used for generating subtitles for movies, news reports or like TV shows. FIG. 13 shows an embodiment of the transcription system 1 according to the present invention for generating subtitles for a movie. In the given embodiment a content provider 8 has a database for movies and film which have to be supplemented with subtitles. From a database 8A storing the movie or film to be added with subtitles video data is supplied to a screen 9 and then displayed to an operator which has a script and listens to the displayed movie in the original language for example by means of loudspeakers of a headset. The operator translates the text spoken by the actor in the film or movie into a microphone provided in input means 2A of a device 2 which supplies the voice to over IP data packets via the network 6 to the transcription server 7. The spoken language of the operator can be revoiced and provided as subtitle text to a subtitle adding unit 8B of the content provider 8. In the unit 8B the generated subtitle text is added to the displayed film and stored in a database.

Figure 14:
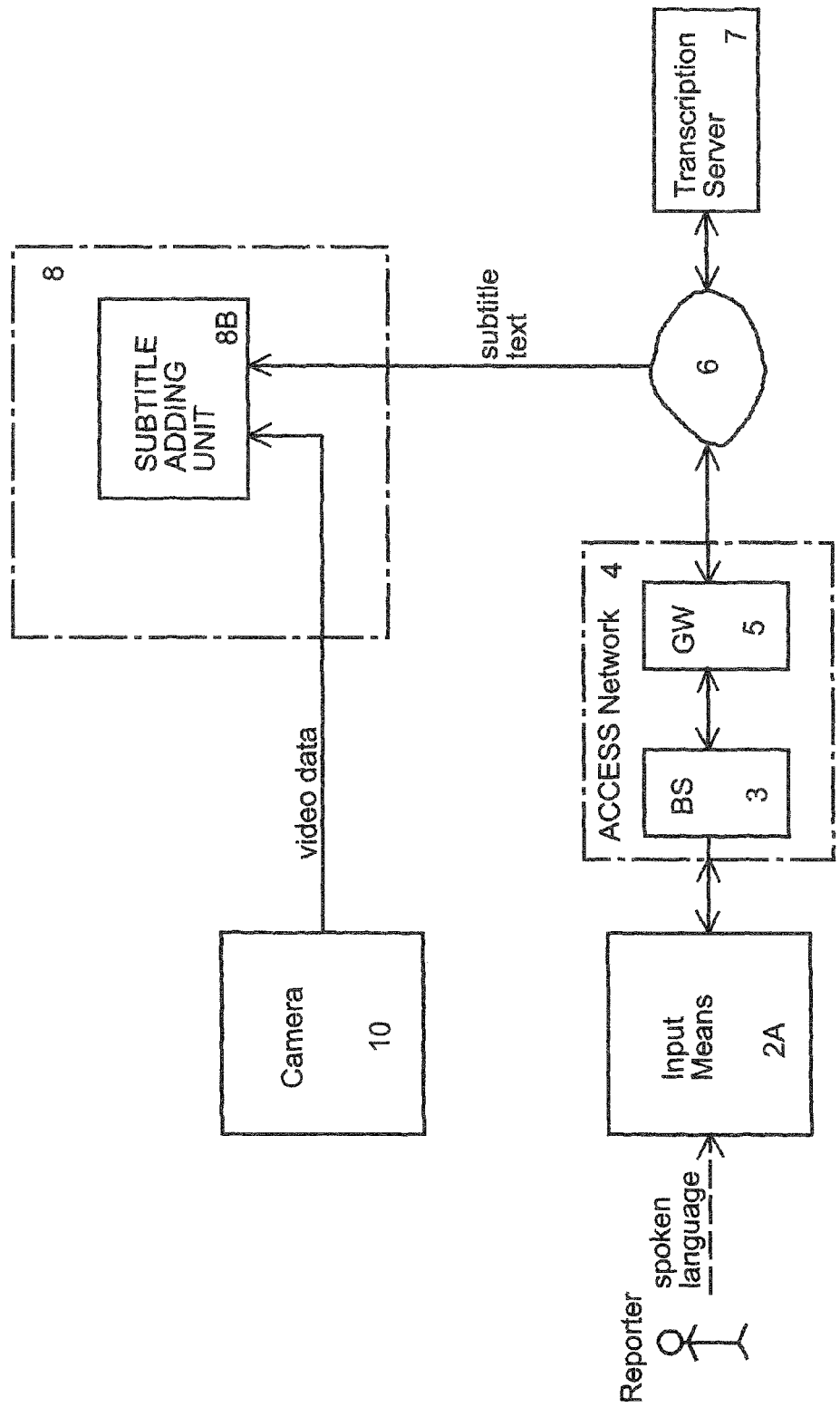
FIG. 14 shows a further embodiment of a transcription system according to the present invention.

The transcription system 1 according to the present invention can also be used to generate subtitle for a live report. As shown in FIG. 14 a reporter looking at a live scene such as a burning house can speak his comments into a microphone of input means 2A and the voice over IP data packets are transported to the transcription server 7 which generates the subtitles automatically for the report. The scene is recorded by a camera 10 which provides video data to a subtitle adding unit 8B which adds the automatically generated subtitle text to the video data. In the embodiments shown in FIGS. 13, 14 the input means 2A can be integrated in a mobile device 2 such as a mobile telephone used by the operator or reporter. This mobile device 2 communicates with the transcription server 7 via an access network 4 as shown in FIGS. 13, 14. In an alternative embodiment the input means 2A are directly connected to the network 6.

In a possible embodiment of the transcription system 1 according to the present invention there is not only one user U and his communication partner CP in which provide a stream of voice over IP data packets but several users. In this embodiment each stream of voice over IP data packets comprises an indication which indicates the origin of the respective streamer voice over IP data packets. Accordingly, in this embodiment a stream of voice over IP data packets can be assigned by the transcription server 7 to a specific person. The recipients such as an operator can then e.g. distinguish different speakers or users by different displayed colours. Furthermore, it is possible that the transformed continuous text is recorded by the transcription server 7 for later download by the user U or for transmission to the user U for example by means of an email. In a further possible embodiment of the system 1 according to the present invention the user U such as a hearing impaired person can also be supplied with an automatically generated sign or body language. In the embodiment shown in FIG. 8 the different operators or communication assistants CA can be located in a call center connected to the transcription server 7 via the network 6. In another embodiment the different operator or communication assistants'CA can work in their home office where the terminals 8-i are located.

In a possible embodiment a user U of a mobile device 2 can load an application program for providing the transcription services TS according to the present invention, from a database of a service provider which runs the transcription server 7. In a possible embodiment the mobile device 2 executes a rich internet application RIA. The mobile device 2 comprises in a preferred embodiment a graphical user interface GUI. A browser executed by the mobile device 2 allows access to the internet. In a preferred embodiment the mobile device 2 allows to scroll through the generated continuous transcription text. The generated continuous text can be stored in a local memory of the mobile device 2. In a possible embodiment the mobile device 2 offers a function for forwarding the generated continuous text to other users. In a possible embodiment the mobile device 2 comprises a touch screen for selecting different kinds of transcription services TS including different selectable functions such as speech recognition, re-voicing, and translation. The system 1 according to the present invention provides a mobile transcription and translation service, in particular for hearing impaired persons but also for not hearing impaired persons travelling abroad. Furthermore, the system 1 according to the present invention can be used for generating subtitles, especially for movies, news reports and live TV shows. In a possible embodiment both the user U and the communication partner CP are hearing impaired persons each having its own mobile device 2.

In a possible embodiment the system 1 according to the present invention can also used for training purposes. For example, a hearing impaired person U cannot easily control whether his pronunciation is correct, because there is no audio feedback for the person. By speaking a sentence into the microphone of the user mobile device 2 according to the present invention the user U can control whether his pronunciation has been correct or not. In this embodiment the user U can switch from a transcription service to a training service. Several further embodiments of the system according to the present invention are possible. For example, an automatic text correction program can perform a text correction of the generated text if necessary. Other possible embodiments comprise a registration and verification procedure for the different users. Furthermore, data compression and encryption can be provided.

The invention claimed is:

1. A transcription method for transcription of spoken language into continuous text for a hearing impaired user comprising the steps of:
   (a) inputting spoken language of at least one hearing impaired user or of a communication partner of the at least one hearing impaired user into a mobile device of the respective user,
   (b) transporting the input spoken language as payload data within a corresponding stream of voice over IP data packets from said mobile device via a communication network to a transcription server;
   (c) detecting a current position of said mobile device by evaluating position data carried in a header of said voice over IP data packets and selecting a source language automatically depending on the detected current position of said mobile device wherein the position data is provided by a GPS unit integrated in the mobile device or corresponds to an assigned IP address of the mobile device;
   (d) selecting a target language of the hearing impaired user automatically by evaluating a user-ID carried in the header of said voice over IP data packets;
   (e) switching streams of voice over IP data packets transporting the spoken language as payload data received by said transcription server via said network from said mobile device by a switching unit of said transcription server to different terminals of speech repeating operators depending on the area of the detected current position of said mobile device of the user, wherein the terminals of the different speech repeating operators are located in a call center or in a home office connected to said transcription server via said communication network;
   (f) outputting said transported spoken language to said speech repeating operators which re-voice the output spoken language, wherein the speech repeating operators are suited operators speaking the matching native language of the detected current position of said mobile device of the user; and
   (g) forwarding the re-voiced language by said switching unit of said transcription server to a speech recognition unit of said transcription server which transforms the re-voiced spoken language into continuous text by use of a suited speech recognition algorithm selected from different speech recognition algorithms depending on the detected current position of said mobile device.

2. The transcription method according to claim 1, further comprising:
   translating the transformed continuous text by a translation unit of said transcription server by means of a suitable text translation algorithm from the selected source language into the selected target language of the user.

3. The transcription method according to claim 2 further comprising:
   forwarding the translated text in the target language of the hearing impaired user by the transcription server to said mobile device where the translated text in the target language of the hearing impaired user is displayed on a screen of said mobile device to the user.

4. A transcription server for transcription of spoken language into continuous text for a hearing impaired user, comprising:
   a speech recognition unit which is adapted to transform spoken language transported as payload data within a corresponding stream of voice over IP data packets from a mobile device via a communication network to said transcription server into continuous text by means of a speech recognition algorithm,
   wherein said transcription server is adapted to detect a current position of said mobile device by evaluating position data carried in a header of received voice over IP data packets and to select automatically a source language depending on the detected current position of the mobile device and being further adapted to select automatically a target language of the user by evaluating a user-ID carried in the header of the received voice over IP data packets, wherein the position data is provided by a GPS unit integrated in the mobile device or corresponds to an assigned IP address of the user of the mobile device,
   wherein the transcription server is further adapted to select a source language of a communication partner depending on the detected current position of said mobile device,
   wherein the transcription server comprises a switching unit which is adapted to switch streams of received voice over IP data packets received from the mobile device of the hearing impaired user via said communication network to different terminals of speech repeating operators depending on the area of the detected current position of said mobile device, wherein the transported spoken language is output by said terminals to said speech repeating operators which re-voice the spoken language, wherein the speech repeating operators are suited operators speaking the matching native language at the detected current position of said mobile device of the user, and wherein the terminals of the different speech repeating operators are located in a call center or in a home office connected to said transcription server via said communication network;
   wherein the switching unit of said transcription server is adapted to forward the re-voiced language to said speech recognition unit of said transcription server which is adapted to transform the re-voiced spoken language of the suited operator into continuous text by use of a suited speech recognition algorithm being selected from different speech recognition algorithms provided for different areas depending on a natural language or dialect spoken in the area of the detected current position of said mobile device.

5. The transcription server according to claim 4, wherein the transcription server further comprises a translation unit which is adapted to translate the transformed continuous text by means of a text translation algorithm from the selected source language to the selected target language of the respective user.

6. The transcription server according to claim 5,
wherein said transcription server is adapted to forward the translated text in the target language of the hearing impaired user via said network to said mobile device having a display which is adapted to display the translated text in the target language of the hearing impaired user to the user.

7. A transcription system for transcription of spoken language into continuous text for a hearing impaired user comprising:
- a transcription server according to claim 4, and
- at least one mobile device having input means for inputting spoken language of at least one hearing impaired user or of a communication partner of the hearing impaired user and having a transceiver for establishing a wireless link to a base station which is connected to a network adapted to transport the input spoken language as payload data within a corresponding stream of voice over IP data packets from said mobile device via said network to the transcription server.

8. The transcription system according to claim 7,
wherein the speech recognition unit comprised in said transcription server is adapted to load a speech recognition algorithm from a database selected depending on the detected current position of said mobile device.

9. The transcription system according to claim 7,
wherein the communication network is formed by the internet.

10. The transcription system according to claim 7,
wherein said transcription system is adapted to generate continuous text in the target language for said hearing impaired user in response to a spoken language in source language input by the communication partner of said hearing impaired user in said mobile device of said hearing impaired user.

11. The transcription system according to claim 7,
wherein said transcription system is adapted to generate a translated continuous text in the target language for a travelling hearing impaired user in a foreign country with another local natural language or dialect in response to a spoken source language input by a communication partner of said travelling hearing impaired user into said mobile device of said travelling hearing impaired user to be displayed in real time by said travelling user on the display of said mobile device.

* * * * *